(12) United States Patent
Cossairt et al.

(10) Patent No.: US 10,572,000 B2
(45) Date of Patent: Feb. 25, 2020

(54) MIXED REALITY VIEWER SYSTEM AND METHOD

(71) Applicant: Universal City Studios LLC, Universal City, CA (US)

(72) Inventors: Travis Cossairt, Orlando, FL (US); Wei Yeh, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 85 days.

(21) Appl. No.: 15/818,463

(22) Filed: Nov. 20, 2017

(65) Prior Publication Data
US 2018/0250589 A1 Sep. 6, 2018

Related U.S. Application Data

(60) Provisional application No. 62/467,817, filed on Mar. 6, 2017.

(51) Int. Cl.
*G06F 3/01* (2006.01)
*G06T 19/00* (2011.01)
(Continued)

(52) U.S. Cl.
CPC ............ *G06F 3/011* (2013.01); *A63F 13/211* (2014.09); *A63F 13/213* (2014.09);
(Continued)

(58) Field of Classification Search
CPC ........ G06F 3/011; G06F 3/012; G06T 19/006; G06T 15/04; G06T 2219/024;
(Continued)

(56) References Cited

U.S. PATENT DOCUMENTS 5,844,530 A 12/1998 Tosaki
6,220,965 B1 4/2001 Hanna et al.
(Continued)

FOREIGN PATENT DOCUMENTS

EP 2138213 A1 12/2009
EP 2189200 A1 5/2010
(Continued)

OTHER PUBLICATIONS

Fred H. Previc et al: "Spatial Disorientation in Aviation, vol. 203 of Progress in astronautics and aeronautics", p. 476, XP055489810, Jan. 1, 2004.
(Continued)

*Primary Examiner* — David Duffy
*Assistant Examiner* — Ankit B Doshi
(74) *Attorney, Agent, or Firm* — Fletcher Yoder, P.C.

(57) ABSTRACT

A mixed reality viewing system includes a viewer configured to be secured to a steady platform and operable by a user to view a theme through the viewer. The viewer includes a display device, a user interface comprising a zoom control, and at least one sensor comprising at least one camera. The mixed reality viewing system also includes a computer graphics generation system communicatively coupled to the viewer. The computer graphics generation system is configured to generate streaming media of a real world environment based on image data captured via the at least one camera of the viewer, generate augmented reality graphics, virtual reality graphics, or both, superimposed on the streaming media of the real world environment, and transmit the streaming media of the real world environment along with the superimposed augmented reality graphics, virtual reality graphics, or both, to be displayed on the display device of the viewer.

20 Claims, 6 Drawing Sheets

(51) Int. Cl.

| | | |
|---|---|---|
| *A63F 13/211* | (2014.01) | |
| *A63F 13/26* | (2014.01) | |
| *A63F 13/30* | (2014.01) | |
| *A63G 7/00* | (2006.01) | |
| *G02B 27/01* | (2006.01) | |
| *A63F 13/25* | (2014.01) | |
| *A63F 13/837* | (2014.01) | |
| *A63F 13/245* | (2014.01) | |
| *A63F 13/355* | (2014.01) | |
| *A63F 13/843* | (2014.01) | |
| *A63F 13/5255* | (2014.01) | |
| *A63G 27/00* | (2006.01) | |
| *A63G 31/00* | (2006.01) | |
| *G06F 1/16* | (2006.01) | |
| *A63G 31/16* | (2006.01) | |
| *A63F 13/213* | (2014.01) | |
| *G06F 3/0484* | (2013.01) | |
| *H04N 13/344* | (2018.01) | |
| *G06F 3/0481* | (2013.01) | |

(52) U.S. Cl.
CPC ............ *A63F 13/245* (2014.09); *A63F 13/25* (2014.09); *A63F 13/26* (2014.09); *A63F 13/30* (2014.09); *A63F 13/355* (2014.09); *A63F 13/5255* (2014.09); *A63F 13/837* (2014.09); *A63F 13/843* (2014.09); *A63G 7/00* (2013.01); *A63G 27/00* (2013.01); *A63G 31/00* (2013.01); *A63G 31/16* (2013.01); *G02B 27/0101* (2013.01); *G02B 27/017* (2013.01); *G02B 27/0172* (2013.01); *G06F 1/163* (2013.01); *G06F 3/012* (2013.01); *G06F 3/04845* (2013.01); *G06T 19/006* (2013.01); *H04N 13/344* (2018.05); *A63F 2300/6653* (2013.01); *G02B 2027/014* (2013.01); *G02B 2027/0138* (2013.01); *G02B 2027/0141* (2013.01); *G02B 2027/0145* (2013.01); *G02B 2027/0178* (2013.01); *G06F 3/04815* (2013.01); *G06F 2203/04806* (2013.01); *G06T 2219/024* (2013.01)

(58) Field of Classification Search
CPC ....... G06T 15/20; G06T 17/00; G02B 27/017; G02B 2027/0138; G02B 2027/0134; A63F 13/211; A63F 13/26; A63F 13/30
See application file for complete search history.

(56) References Cited

U.S. PATENT DOCUMENTS

| | | | |
|---|---|---|---|
| 6,462,769 | B1 | 10/2002 | Trowbridge et al. |
| 6,533,670 | B1 | 3/2003 | Drobnis |
| 6,606,953 | B2 | 8/2003 | Mares |
| 6,796,908 | B2 | 9/2004 | Weston |
| 7,495,638 | B2 | 2/2009 | Lamvik et al. |
| 7,955,168 | B2 | 6/2011 | Mendelsohn et al. |
| 8,025,581 | B2 | 9/2011 | Bryan et al. |
| 8,066,576 | B2 | 11/2011 | Threlkel |
| 8,212,859 | B2 | 7/2012 | Tang et al. |
| 8,491,403 | B2 | 7/2013 | Schreibfeder |
| 8,511,827 | B2 | 8/2013 | Hua et al. |
| 8,576,276 | B2 | 11/2013 | Bar-Zeev et al. |
| 8,705,177 | B1 | 4/2014 | Miao |
| 8,767,014 | B2 | 7/2014 | Vaught et al. |
| 8,810,482 | B2 | 8/2014 | Abdollahi et al. |
| 8,867,139 | B2 | 10/2014 | Gupta |
| 8,894,492 | B2 | 11/2014 | Ackley et al. |
| 8,941,559 | B2 | 1/2015 | Bar-Zeev et al. |
| 9,052,505 | B2 | 6/2015 | Cheng et al. |
| 9,092,953 | B1 | 7/2015 | Mortimer et al. |
| 9,155,971 | B1 | 10/2015 | Trowbridge |
| 9,253,524 | B2 | 2/2016 | Kaburlasos et al. |
| 9,266,028 | B2 | 2/2016 | Alfieri et al. |
| 9,268,138 | B2 | 2/2016 | Shimizu et al. |
| 9,285,871 | B2 | 3/2016 | Geisner et al. |
| 9,286,730 | B2 | 3/2016 | Bar-Zeev et al. |
| 9,292,973 | B2 | 3/2016 | Bar-Zeev et al. |
| 9,310,591 | B2 | 4/2016 | Hua et al. |
| 9,316,834 | B2 | 4/2016 | Makino et al. |
| 9,342,610 | B2 | 5/2016 | Liu et al. |
| 9,354,446 | B2 | 5/2016 | Abdollahi et al. |
| 9,360,671 | B1 | 6/2016 | Zhou |
| 9,366,870 | B2 | 6/2016 | Cheng et al. |
| 9,366,871 | B2 | 6/2016 | Ghosh et al. |
| 9,383,582 | B2 | 7/2016 | Tang et al. |
| 9,389,423 | B2 | 7/2016 | Bhardwaj et al. |
| 9,395,811 | B2 | 7/2016 | Vaught et al. |
| 9,454,010 | B1 | 9/2016 | Passmore et al. |
| 9,497,501 | B2 | 11/2016 | Mount et al. |
| 9,519,144 | B2 | 12/2016 | Lanman et al. |
| 9,569,886 | B2 | 2/2017 | Akenine-Moller et al. |
| 9,582,922 | B2 | 2/2017 | Lawman et al. |
| 9,588,341 | B2 | 3/2017 | Bar-Zeev et al. |
| 9,606,362 | B2 | 3/2017 | Passmore et al. |
| 9,638,921 | B2 | 5/2017 | Miller et al. |
| 9,658,460 | B2 | 5/2017 | Lee et al. |
| 9,690,371 | B2 | 6/2017 | Saito |
| 9,690,374 | B2 | 6/2017 | Clement et al. |
| 9,690,375 | B2 | 6/2017 | Blum et al. |
| 9,733,477 | B2 | 8/2017 | Gupta |
| 9,733,480 | B2 | 8/2017 | Baek et al. |
| 9,733,481 | B2 | 8/2017 | Carollo et al. |
| 9,741,125 | B2 | 8/2017 | Baruch et al. |
| 9,763,342 | B2 | 9/2017 | Long et al. |
| 9,778,467 | B1 | 10/2017 | White et al. |
| 9,839,857 | B2 | 12/2017 | Wagner |
| 9,864,406 | B2 | 1/2018 | Miller et al. |
| 9,869,862 | B2 | 1/2018 | Cheng et al. |
| 9,874,749 | B2 | 1/2018 | Bradski et al. |
| 9,877,016 | B2 | 1/2018 | Esteban et al. |
| 9,885,871 | B2 | 2/2018 | Abdollahi et al. |
| 9,933,624 | B1 | 4/2018 | White et al. |
| 2006/0250322 | A1 | 11/2006 | Hall et al. |
| 2008/0188318 | A1 | 8/2008 | Piccionelli et al. |
| 2010/0045700 | A1* | 2/2010 | Lefevre .................. G02B 23/00 345/633 |
| 2010/0131865 | A1 | 5/2010 | Ackley et al. |
| 2011/0141246 | A1 | 6/2011 | Schwartz et al. |
| 2011/0242134 | A1 | 10/2011 | Miller et al. |
| 2012/0320100 | A1 | 12/2012 | Machida et al. |
| 2013/0137076 | A1 | 5/2013 | Perez et al. |
| 2013/0141419 | A1 | 6/2013 | Mount et al. |
| 2014/0118829 | A1 | 5/2014 | Ma et al. |
| 2014/0146394 | A1 | 5/2014 | Tout et al. |
| 2014/0364208 | A1 | 12/2014 | Perry |
| 2014/0364209 | A1 | 12/2014 | Perry |
| 2014/0364212 | A1 | 12/2014 | Osman et al. |
| 2015/0003819 | A1 | 1/2015 | Ackerman et al. |
| 2015/0090242 | A1 | 4/2015 | Weston et al. |
| 2015/0097863 | A1 | 4/2015 | Alaniz et al. |
| 2015/0100179 | A1 | 4/2015 | Alaniz et al. |
| 2015/0103152 | A1 | 4/2015 | Qin |
| 2015/0190726 | A1 | 7/2015 | Frolov |
| 2015/0312561 | A1 | 10/2015 | Hoof et al. |
| 2015/0363976 | A1 | 12/2015 | Henson |
| 2016/0048203 | A1 | 2/2016 | Blum et al. |
| 2016/0062454 | A1 | 3/2016 | Wang et al. |
| 2016/0089610 | A1 | 3/2016 | Boyle et al. |
| 2016/0097929 | A1 | 4/2016 | Yee et al. |
| 2016/0097930 | A1 | 4/2016 | Robbins et al. |
| 2016/0098095 | A1 | 4/2016 | Gonzalez-Banos et al. |
| 2016/0171779 | A1 | 6/2016 | Bar-Zeev et al. |
| 2016/0188943 | A1 | 6/2016 | Franz |
| 2016/0196694 | A1 | 7/2016 | Lindeman |
| 2016/0210784 | A1 | 7/2016 | Ramsby et al. |
| 2016/0240013 | A1 | 8/2016 | Spitzer |
| 2016/0346704 | A1 | 12/2016 | Wagner |
| 2016/0353089 | A1 | 12/2016 | Gallup et al. |
| 2016/0364907 | A1 | 12/2016 | Schoenberg |

(56) References Cited

U.S. PATENT DOCUMENTS

| | | |
|---|---|---|
| 2016/0370855 A1 | 12/2016 | Lanier et al. |
| 2016/0377869 A1 | 12/2016 | Lee et al. |
| 2016/0379417 A1 | 12/2016 | Mount et al. |
| 2017/0053445 A1 | 2/2017 | Chen et al. |
| 2017/0053446 A1 | 2/2017 | Chen et al. |
| 2017/0053447 A1 | 2/2017 | Chen et al. |
| 2017/0059831 A1 | 3/2017 | Hua et al. |
| 2017/0116950 A1 | 4/2017 | Onal |
| 2017/0131581 A1 | 5/2017 | Pletenetskyy |
| 2017/0171538 A1 | 6/2017 | Bell et al. |
| 2017/0176747 A1 | 6/2017 | Vallius et al. |
| 2017/0178408 A1 | 6/2017 | Bavor, Jr. et al. |
| 2017/0193679 A1 | 7/2017 | Wu et al. |
| 2017/0208318 A1 | 7/2017 | Passmore et al. |
| 2017/0212717 A1 | 7/2017 | Zhang |
| 2017/0220134 A1 | 8/2017 | Burns |
| 2017/0221264 A1 | 8/2017 | Perry |
| 2017/0236332 A1 | 8/2017 | Kipman et al. |
| 2017/0242249 A1 | 8/2017 | Wall et al. |
| 2017/0255011 A1 | 9/2017 | Son et al. |
| 2017/0262046 A1 | 9/2017 | Clement et al. |
| 2017/0262047 A1 | 9/2017 | Saito |
| 2017/0270841 A1 | 9/2017 | An et al. |
| 2017/0277256 A1 | 9/2017 | Burns et al. |
| 2017/0285344 A1 | 10/2017 | Benko et al. |
| 2017/0293144 A1 | 10/2017 | Cakmakci et al. |
| 2017/0316607 A1 | 11/2017 | Khalid et al. |
| 2017/0323416 A1 | 11/2017 | Finnila |
| 2017/0323482 A1 | 11/2017 | Coup et al. |
| 2017/0336863 A1 | 11/2017 | Tilton et al. |
| 2017/0337737 A1 | 11/2017 | Edwards et al. |
| 2017/0345198 A1 | 11/2017 | Magpuri et al. |
| 2017/0363872 A1 | 12/2017 | Border et al. |
| 2017/0363949 A1 | 12/2017 | Valente et al. |
| 2017/0364145 A1 | 12/2017 | Blum et al. |
| 2018/0003962 A1 | 1/2018 | Urey et al. |
| 2018/0018515 A1 | 1/2018 | Spizhevoy et al. |
| 2018/0024370 A1 | 1/2018 | Carollo et al. |
| 2018/0032101 A1 | 2/2018 | Jiang |
| 2018/0033199 A9 | 2/2018 | Eatedali et al. |
| 2018/0059715 A1 | 3/2018 | Chen et al. |
| 2018/0059776 A1 | 3/2018 | Jiang et al. |
| 2018/0095498 A1 | 4/2018 | Raffle et al. |
| 2018/0104601 A1 | 4/2018 | Wagner |
| 2018/0164594 A1 | 6/2018 | Lee et al. |
| 2018/0196262 A1 | 7/2018 | Cage |
| 2018/0203240 A1 | 7/2018 | Jones et al. |

FOREIGN PATENT DOCUMENTS

| | | |
|---|---|---|
| FR | 2911463 A1 | 7/2008 |
| JP | 2012141461 A | 7/2012 |
| JP | 5790187 | 10/2015 |
| JP | 5801401 B2 | 10/2015 |
| JP | 2015228050 A | 12/2015 |
| JP | 5913346 B2 | 4/2016 |
| JP | 2016528942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| WO | 1996031444 | 7/1998 |
| WO | 9851385 A1 | 11/1998 |
| WO | 2008059086 A1 | 5/2008 |
| WO | 2016023817 A2 | 2/2016 |

OTHER PUBLICATIONS

Jiejie Zhu et al: "Handling occlusions in video-based augmented reality using depth information", Computer Animation and Virtual Worlds, vol. 21, No. 5, pp. 509-521, XP055184802, Sep. 13, 2010.

Anonymous: "Head-up display—Wikipedia", XP055489840, retrieved from the Internet: URL:https://en.wikipedia.org/w/index.php?title=Head-up_display&oldid=766263622, pp. 2-3, Feb. 19, 2017.

Anonymous: "Head-mounted display—Wikipedia", XP055489914, retrieved from the Internet: URL:https://en.wikipedia.org/w/index.php?title=Head-mounted_display&oldid=767462464, pp. 1-3, Feb. 26, 2017.

Anonymous: "Augmented reality—Wikipedia", XP55488978, retrieved from the Internet: URL:https://en.wikipedia.org/w/index.php?title=Augmented_reality&oldid=768706789, pp. 3-4, Mar. 5, 2017.

PCT/US2018/020951 International Search Report and Written Opinion dated Jul. 5, 2018.

\* cited by examiner

MIXED REALITY VIEWER SYSTEM AND METHOD

CROSS REFERENCE TO RELATED APPLICATION

This application claims priority to and benefit of U.S. Provisional Patent Application No. 62/467,817, entitled "SYSTEMS AND METHODS FOR DIGITAL OVERLAY IN AN AMUSEMENT PARK ENVIRONMENT," filed Mar. 6, 2017, which is herein incorporated by reference in its entirety.

BACKGROUND

The subject matter disclosed herein relates to amusement park attractions, and more specifically, to providing augmented and virtual reality experiences in amusement park attractions.

Amusement parks or theme parks may include various entertainment attractions in providing enjoyment to guests (e.g., families and/or people of all ages) of the amusement parks. Traditionally, the attractions may include themed environments that may be established using equipment, furniture, building layouts, props, decorations, and so forth. Depending on the complexity of the themed environments, this could prove to be very difficult and time-consuming to setup and replace the themed environment. In addition, it may be very difficult to setup a themed environment that is entertaining for all guests. Indeed, the same themed environment may be appealing to some guests, but not others. Therefore, it is now recognized that it is desirable to include attractions where it may be possible to change attraction themes, or to include or remove certain themed features in such attractions in a flexible and efficient manner relative to traditional techniques. It is also now recognized that it may be desirable to enhance the immersive experience of guests for such attractions, and to provide a more personalized or customized experience for guests.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a mixed reality viewing system includes a viewer configured to be secured to a steady platform and operable by a user to view a theme through the viewer. The viewer includes a display device, a user interface comprising a zoom control, and at least one sensor, the at least one sensor comprising at least one camera. The mixed reality viewing system also includes a computer graphics generation system communicatively coupled to the viewer. The computer graphics generation system is configured to generate streaming media of a real world environment based on image data captured via the at least one camera of the viewer, generate augmented reality graphics, virtual reality graphics, or both, superimposed on the streaming media of the real world environment, and transmit the streaming media of the real world environment along with the superimposed augmented reality graphics, virtual reality graphics, or both, to be displayed on the display device of the viewer.

In another embodiment, a fixed-position viewer includes a display configured to display a streaming media to a user, wherein the displayed streaming media comprises a mixed reality (MR) environment including augmented reality (AR) graphics, a virtual reality (VR) graphics, or both. The fixed-position viewer includes a camera configured to capture image data of a real world environment surrounding the fixed position viewer. The fixed-position viewer also includes at least one sensor configured to collect information relevant to generation of the streaming media.

In another embodiment, a method includes receiving and analyzing real-time data via a computer graphics generation system, wherein receiving the real-time data comprises receiving, via the computer graphics generation system, data from at least one sensor and a user interface of a fixed-position viewer. The method includes generating, via the computer graphics generation system, gaming effects based on the received real-time data, wherein the gaming effects comprise augmented reality (AR) graphics, virtual reality (VR) graphics, or both. The method includes overlaying, via the computer graphics generation system, the generated gaming effects onto a visualization of a real world environment to produce a mixed reality visualization. The method also includes transmitting, via the computer graphics generation system, the mixed reality visualization to the fixed-position viewer, and displaying, via the computer graphics generation system, the mixed reality visualization on a display of the fixed-position viewer.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
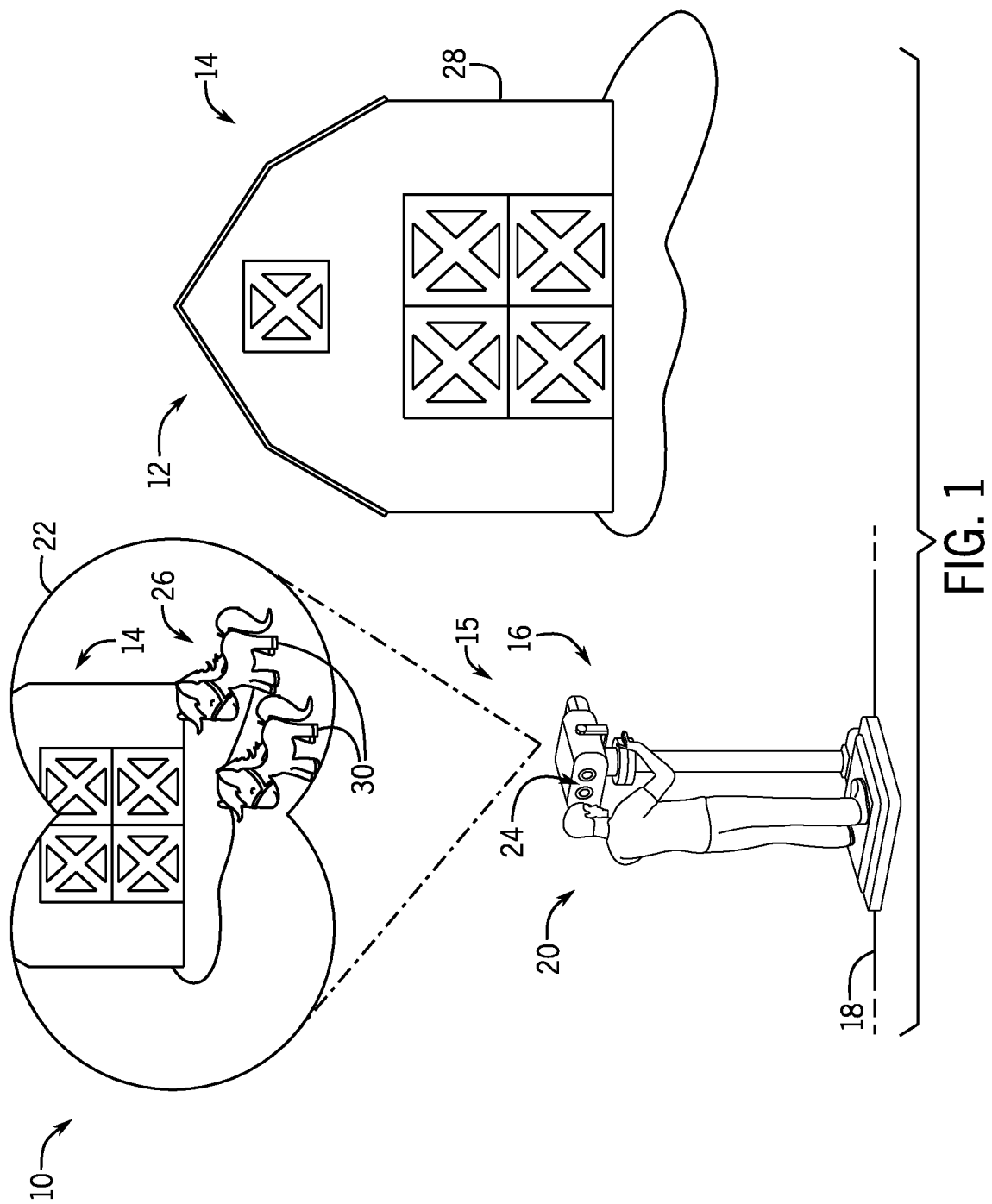
FIG. 1 illustrates an embodiment of an amusement park having themed attractions enhanced by an augmented reality and/or virtual reality (AR/VR) system including one or more fixed-position AR/VR viewers, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing an augmented reality (AR) experience, a virtual reality (VR) experience, a mixed reality (e.g., a combination of AR and VR) experience, or a combination thereof, as part of an attraction in an amusement park or a theme park. In particular, an AR and/or VR (AR/VR) system may include one or more viewers to provide AR/VR experiences to guests of the amusement park. For example, guests may peer a scenery through a viewer, and the viewer may facilitate an AR experience, a VR experience, or a combination of both experiences. In one embodiment, the viewer may be a fixed-positioned viewer (e.g., a viewer similar to a binocular, a view finder, or a telescope, fixed to a steady platform or the ground). Thus, the viewer may be referred to as a fixed-position AR/VR viewer. The fixed-position AR/VR viewer may include at least one camera that may be used to capture real-time image data (e.g., pictures and/or video captured during live use and transmitted in substantially real-time) of the real-world environment (e.g., aspects of the physical amusement park). The fixed-position AR/VR viewer may include a display. For example, the fixed-position AR/VR viewer may include at least two displays respectively corresponding to each eye of a user using the fixed-position AR/VR viewer. The fixed-position AR/VR viewer may be designed to rotate and tilt such that a user is able to change the angle of view, to look around a scene, and so forth.

The AR/VR system may include a computer graphics generation system that receives real-time image data (e.g., pictures and/or video captured during live use and transmitted in substantially real-time) from the fixed-position AR/VR, and may render a video stream of the real-world environment along with various AR, VR, or combined AR and VR (AR/VR) graphical images to the display of the fixed-position AR/VR viewer. In one embodiment, the fixed-position AR/VR viewer may be operable to zoom-in or zoom-out on certain areas in the AR/VR environments and transition between the AR and VR environments. In particular, the user may zoom-in on an area (e.g., a feature, an object) in an AR environment, and as the user continues to zoom-in, the video stream transitions to a VR environment. In one embodiment, the fixed-position AR/VR viewer may be operated by the user via a user interface (e.g., one or more push buttons, joysticks) of the fixed-position AR/VR viewer to engage or interact with features or objects in the AR/VR environments (e.g., grabbing, selecting, targeting, and/or moving objects). Further, certain embodiments of the AR/VR system may provide similar experiences for multiple users, for example using a series of networked fixed-position AR/VR viewers.

While present embodiments may be implemented in a variety of settings, an example amusement park 10 having features of the present disclosure is depicted in FIG. 1. As illustrated, the amusement park 10 includes a themed attraction 12. The themed attraction 12 may include physical structures 14 including fixed equipment, building layouts, props, decorations, and so forth, corresponding to the theme. In the illustrated example, the themed attraction 12 is decorated as a farm/barn house. The themed attraction 12 may include an AR/VR system 15 including one or more fixed-position AR/VR viewers 16 to create more immersive, personalized, and/or interactive experiences for guests of the amusement park 10. In particular, guests or users may look around the themed attraction 12 through the fixed-position AR/VR viewers 16 for enhanced viewing experiences. The fixed-position AR/VR viewer 16 may be fixed to a steady platform or ground 18, and a user 20 may approach the fixed-position AR/VR viewer 16 and look around the themed attraction 12 using the fixed-position AR/VR viewer 16.

The fixed-position AR/VR viewer 16 may have functions that a typical binocular or view finder may have. For example, the fixed-position AR/VR viewer 16 may be rotated or tilted by the user 20 to view different areas of the themed attraction 12. For example, the fixed-position AR/VR viewer 16 may have zooming effects such that the user 20 may zoom-in or zoom-out on areas of the themed attraction 12. In addition, the fixed-position AR/VR viewer 16 may facilitate an AR experience, a VR experience, or a combination of both experiences. In particular, the fixed-position AR/VR viewer 16 may render an AR/VR environment 22 on a display 24, and the AR/VR environment 22 may include AR/VR graphics 26. In the illustrated example, a guest looking at the themed attraction 12, without using the fixed-position AR/VR viewer 16, may only see a barn house 28. However, the user 20 using the fixed-position AR/VR viewer 16, may see the barn house 28 as well as the AR/VR graphics 26, such as two horses 30 in front of the barn house 28.

Figure 2:
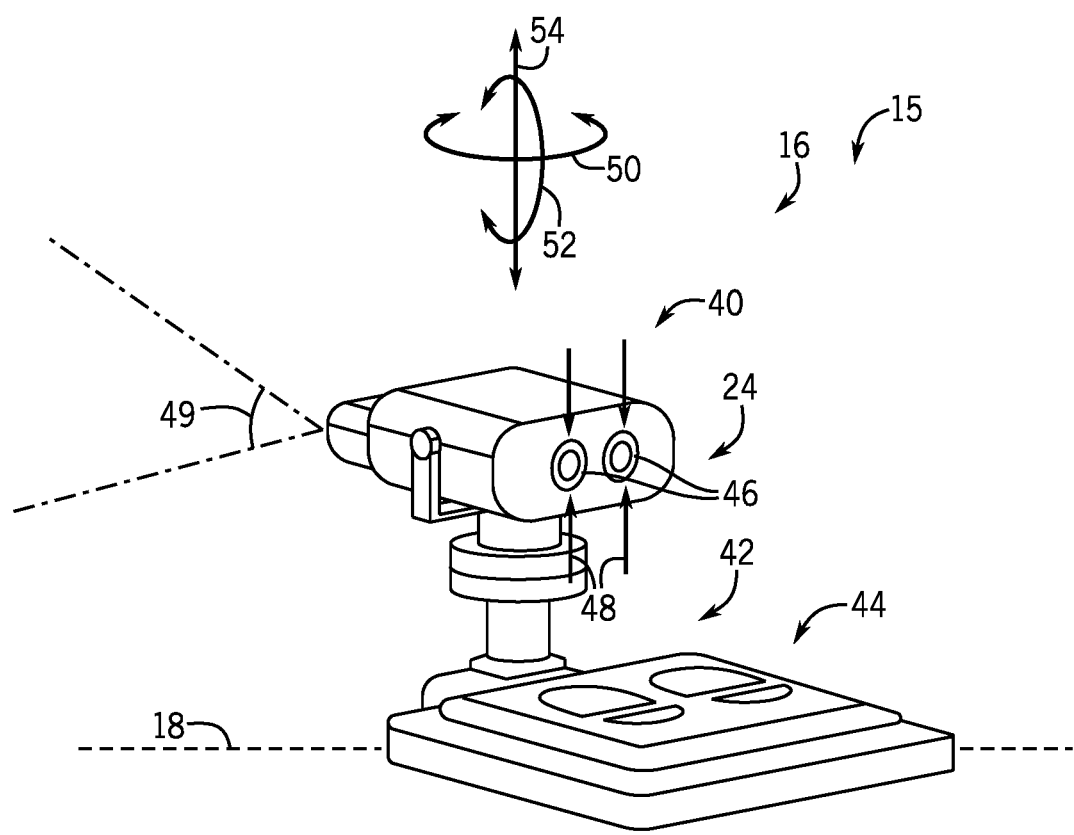
FIG. 2 is a perspective view of an embodiment of the fixed-position AR/VR viewer of FIG. 1, in accordance with present embodiments.

A perspective view of an embodiment of the fixed-position AR/VR viewer 16 is shown in FIG. 2. As shown, the fixed-position AR/VR viewer 16 may be fixed to the steady platform or ground 18. The fixed-position AR/VR viewer 16 may include a viewer portion 40 that includes the display 24, and a fixture portion 42 that secures the fixed-position AR/VR viewer 16 to the steady platform or ground 18. The user 20 may stand in a viewing area 44 to look into the display 24 of the fixed-position AR/VR viewer 16. The display 24 may include one or more than one displays (e.g., two displays 46 respectively corresponding to each eye of the user 20). The displays 46 may have any suitable shapes, such as circle, square, rectangle, oval, etc. The displays 46 may have a characteristic dimension 48. In some embodiments, the display 24 may be configured in a way that guests near the user 20 may also see what is being presented to the user 20. For example, the characteristic dimension 48 of the displays 46 are sufficiently large such that guests behind and/or adjacent to the user 20 may see what is being shown on the displays 46.

The fixed-position AR/VR viewer 16 has an angle of view 49. In one embodiment, the user 20 may change the angle of view 49 by rotating or tilting the viewer portion 40 along rotational directions 50 (e.g., substantially parallel to the steady platform or ground 18), along rotational directions 52 (e.g., substantially parallel to the rotational directions 50), or a combination thereof. In one embodiment, the user 20 may also change the angle of view 49 by raising or lowering the viewer portion 40 along directions 54 (e.g., directions normal to the steady platform or ground 18). As may be appreciated, the fixed-position AR/VR viewer 16 may include other hardware and/or software components as will be discussed in FIG. 3.

Figure 3:
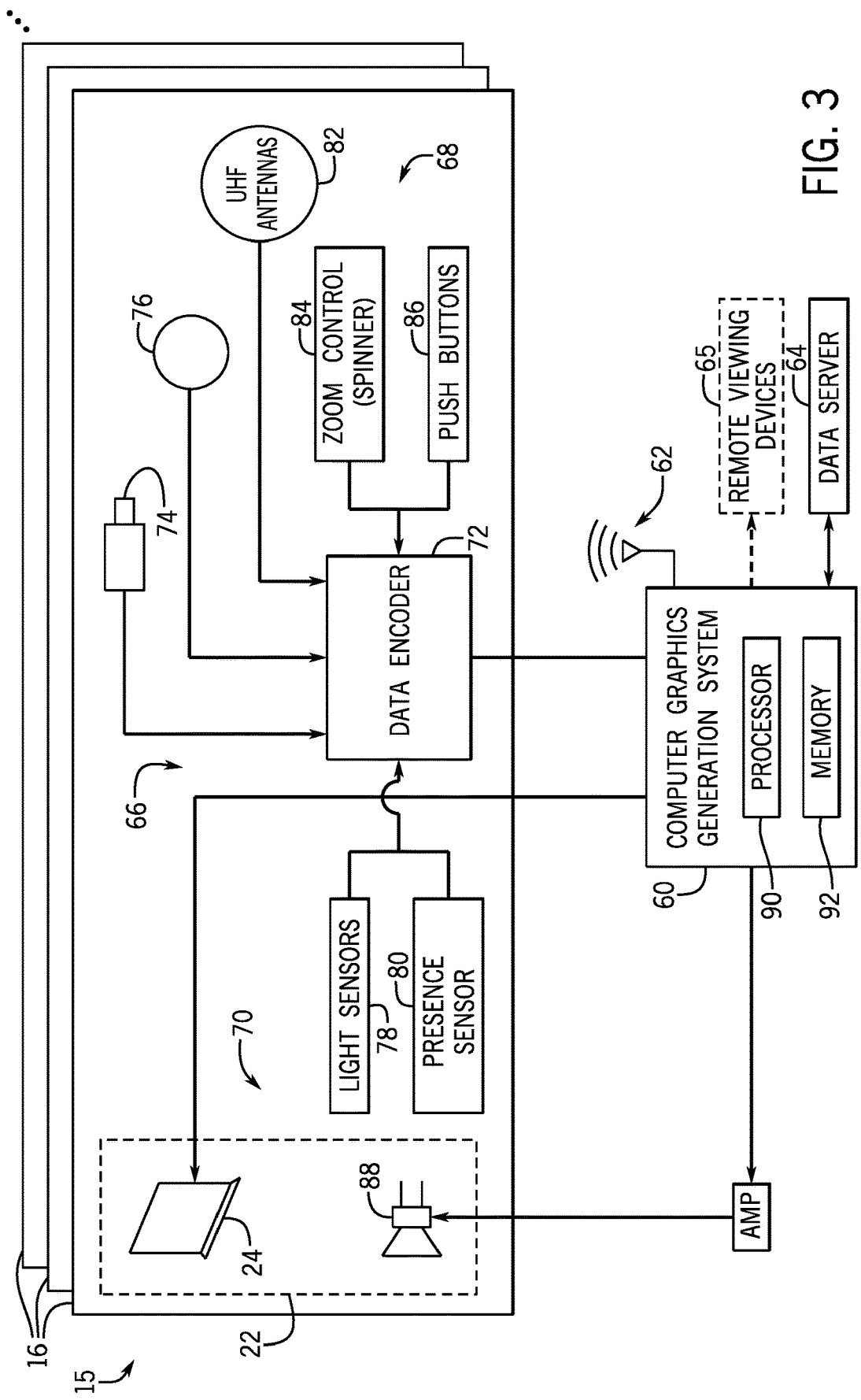
FIG. 3 is a block diagram of an embodiment of the AR/VR system of FIG. 1, in accordance with present embodiments.

FIG. 3 is a block diagram of various components of the AR/VR system 15. In the illustrated embodiment, the AR/VR system 15 includes the one or more fixed-position AR/VR viewers 16 communicatively and operatively coupled to a computer graphics generation system 60 (e.g., within the amusement park 10) via a communication network 62. The communication network 62 may include wireless local area networks, wireless wide area networks, near field communication, and/or a wired network via Ethernet cables, fibers, etc. The one or more fixed-position AR/VR viewers 16 may transmit signals or data to and receive signals or data from the computer graphics generation system 60 to create the AR/VR environment 22 (e.g., the AR/VR graphics 26 and/or sound effects presented via the one or more fixed-position AR/VR viewers 16). The computer graphics generation system 60 may be communicatively coupled to a data server 64 via the communication network 62. The data server 64 may be a remote or onsite data server that may store and/or process user information of the users 20. The user information may include any suitable information provided by or authorized by the users 20, such as payment information, membership information, personal information (e.g., age, height, special needs, etc.), gaming information (e.g., information about the video game associated with the themed attraction 12, information about a particular character the user 20 is associated with in the video game, information about game history of the user 20), and so forth.

As illustrated in FIG. 3, the fixed-position AR/VR viewer 16 may include sensors 66, a user interface 68, presentation devices 70, and a data encoder 72 communicatively coupled to the sensors 66 and user interface 68. The data encoder 72 may receive and/or process (e.g., encode) data or signals provided by the sensors 66 and the user interface 68. For example, the encoder 72 may be implemented as one or more processors that may follow specific algorithms to collect streamable data provided by the sensors 66 and the user interface 68, and generate encoded data. The encoder 72 may be communicatively coupled to the computer graphics generation system 60, e.g., via the communication network 62, to stream the encoded data (corresponding to data and signals from the sensors 66 and the user interface 68) to the computer graphics generation system 60. The encoder 72 may stream the encoded data to the computer graphic generation system 60 in substantially real-time and/or upon receiving instructions from the computer graphics generation system 60.

The sensors 66 may include one or more cameras 74, one or more orientation and position sensors 76 (e.g., accelerometers, magnetometers, gyroscopes, Global Positioning System (GPS) receivers, one or more multi-degree-of-freedom (MDOF) inertial measurement units (IMUs), and so forth), one or more light sensors 78, one or more presence sensors 80 (e.g., motion sensors, ultrasound sensors, reflectance sensors, break-beam sensor, and so forth), and one or more antennas 82.

The one or more cameras 74 may capture real-world images (e.g., images and/or real-time video data of the real-world environment, such as the themed attraction 12) during live use of the user 20. The one or more cameras 74 may transmit the captured real-world images in substantially real-time. In one embodiment, the fixed-position AR/VR viewer 16 may include at least two cameras 74, which may respectively correspond to the respective points of view (e.g., right and left eye views) of the user 20. In one embodiment, the one or more cameras 74 may be high resolution and/or high speed cameras. For example, the one or more cameras 74 may be 4K-resolution digital high speed cameras (e.g., frame-rate exceeding about sixty frames per second and horizontal resolution in the order of 4,000 pixels). Since the one or more cameras 74 (e.g., the one or more cameras 74 are disposed on the fixed-position AR/VR viewer 16) have high-speed and high resolution capabilities, the captured real-world images may have high resolution and high three-dimensional (3D) depth, which may aid generation of AR/VR graphics with high levels of realism. The one or more orientation and position sensors 76 may capture data indicative of the angle of view 49 of the fixed-position AR/VR viewer 16. The one or more light sensors 78 may be any suitable light sensors for detecting the ambient light level (e.g., how bright/dark it is).

The one or more presence sensors 80 may capture data indicative of presence of an object (e.g., a real-world object, a person) that may block or come into the angle of view 49 of the fixed-position AR/VR viewer 16. The one or more presence sensors 80 may capture data indicative of presence of the user 20. In one embodiment, the fixed-position AR/VR viewer 16 may be activated (e.g., via the processor 90) and deactivated based on the data captured by the one or more presence sensors 80. For example, the fixed-position AR/VR viewer 16 may be deactivated to a sleep or standby mode if the fixed-position AR/VR viewer 16 is not in use (e.g., the presence of the user 20 is not detected), and the fixed-position AR/VR viewer 16 may be activated from the sleep or standby mode in response to detecting the presence of the user 20. In one embodiment, the one or more presence sensors 80 may be disposed on a guest side (guests next to the user 20) and communicatively coupled (e.g., via wired or wireless connection) to the fixed-position AR/VR viewer 16. The one or more antennas 82 may be radio-frequency identification (RFID) antennas 82 used to identify the user 20.

The user interface 68 (e.g., a game control) may include any suitable input devices (e.g., push buttons, joysticks, spinners, knobs) to enable the user 20 to provide instructions relating to the operation of the fixed-position AR/VR viewer 16. For example, the user interface 68 may include a zoom control 84 (e.g., a spinner, a knob) configured to enable the user 20 to zoom-in and zoom-out on features (e.g., real-word features, the AR/VR graphic 26) shown on the display 24. The user interface 68 may also include push buttons 86 that may be configured to enable different actions and/or effects to be applied in the AR/VR environment 22. For example, the push buttons 86 may enable the user 20 to control a character or an object of the AR/VR graphics 26 to move in different directions (e.g., up, down, left, right) in the AR/VR environment 22. For example, the push buttons 86 may enable the user 20 to make selections or grab/release objects of the AR/VR graphics 26 in the AR/VR environment 22. In certain embodiments, data captured by the one or more orientation and position sensors 76 and/or usage of the user interface 68 may be used for analyzing which attraction features (e.g., real-world objects, AR/VR graphics 26) the user 20 spends the most time looking and/or interacting.

The presentation devices 70 may be communicatively and operatively coupled to the computer graphics generation system 60, via the communication network 62, to receive signals or data corresponding to presentation content, and display the presentation content (e.g., AR/VR graphical images or video streams, the AR/VR graphics 26) to create the AR/VR environment 22. The presentation devices 70 may include the display 24 and an audio transducer 88 (e.g., a speaker). As set forth above, the display 24 may include one or more displays 46, for example two displays 46 respectively corresponding to each eye of the user 20 using the fixed-position AR/VR viewer 16. The display 24 may also be configured such that guests next to the user 20 may also see what is shown to the user 20 on the display 24. In one embodiment, the display 24 may be a 4K-resolution display (e.g., horizontal resolution in the order of 4,000 pixels). The audio transducer 88 may include any suitable devices, such as one or more speakers, to present sound effects.

To support the creation of the AR/VR environment 22, the computer graphics generation system 60 may include processing circuitry, such as a processor 90 and a memory 92. The processor 90 may be operatively coupled to the memory 92 to execute instructions for carrying out the presently disclosed techniques of generating the captured real-world images merged with the AR/VR graphics 26 to enhance the AR/VR experience of the user 20. These instructions may be encoded in programs or code stored in a tangible non-transitory computer-readable medium, such as the memory 92 and/or other storage. The processor 90 may be a general-purpose processor, system-on-chip (SoC) device, an application-specific integrated circuit (ASIC), or some other similar processor configuration.

The computer graphics generation system 60 may include any suitable hardware, software (e.g., a game engine), and algorithms, enabling a suitable AR/VR platform. For example, the computer graphics generation system 60 may store in the memory 92 or access in the data server 64 a model (e.g., a three-dimensional model with spatial information, a computer-aided design (CAD) file) of the themed attraction 12 and position of the fixed-position AR/VR viewer 16. In particular, the model may include position information of the fixed-position AR/VR viewer 16 relative to the real world surrounding environment (e.g., the themed attraction 12). The model is used, together with other inputs from the data encoder 72 (e.g., encoded data from the sensors 66 and the user interface 68 of the fixed-position AR/VR viewer 16) to provide signals to the presentation devices 70. In particular, the computer graphics generation system 60 is dynamically updated as the user 20 operates the fixed-position AR/VR viewer 16 (e.g., changing the angle of view 49, zooming in and out, engaging the push buttons 86) to generate and render the AR/VR graphics 26 superimposed on the captured real-world images to create the AR/VR environment 22.

As may be appreciated, because the themed attraction 12 and position of the fixed-position AR/VR viewer 16 are modeled and the model (e.g., three-dimensional model with spatial information, computer-aided design (CAD) file) is stored in or accessible by the computer graphics generation system 60, the computer graphics generation system 60 may only need to determine the angle of view 49 of the fixed-position AR/VR viewer 16 to determine where the user 20 is looking and determine suitable superposition of the AR/VR graphics and the captured real-world images. Accordingly, the computer graphics generation system 60 may more efficiently (e.g., using less computing power) combine the AR/VR graphics 26 and the captured real-world images to generate the AR/VR environment 22. In particular, the computer graphics generation system 60 may efficiently generate and superimpose the AR/VR graphics 26 onto the captured real-world images such that the AR/VR graphics 26 and real-world images are aligned with high levels of realism to enable the AR/VR graphics 26 to behave how they would under normal conditions. For example, if the AR/VR graphics 26 should be fully or partially occluded by any real-world objects (e.g., the physical structure 14, guests, buildings, objects in the real world) according to the angle of view 49 of the fixed-position AR/VR viewer 16, the computer graphics generation system 60 may generate fully or partially transparent AR/VR graphics 26. For example, the computer graphics generation system 60 may generate the AR/VR graphics 26 to overlay a real-world object so that the real-world object appears to no longer be present or deleted (e.g., the real-world object is fully or partially occluded with the AR/VR graphics 26).

Furthermore, because the AR/VR graphics 26 are generated and overlaid on the captured real-world images in substantially real-time as the real-world images are captured, the realism of the AR/VR graphics 26 may be enhanced. For example, as the user 20 zooms in via the zoom control 84 in the AR/VR environment 22, the computer graphics generation system 60 generates or updates the AR/VR graphics 26 based on the optically zoomed-in images captured by the one or more cameras 74 in substantially real time, such that the AR/VR graphics 26 seem more realistic (as compared to AR/VR graphics 26 generated based on digitally zoomed-in real-world images). In certain embodiments, the AR/VR graphics 26 may also be generated to prompt the user 20 to select certain game options (e.g., selecting a character, selecting team members, selecting tools/utilities corresponding to a game in the AR/VR environment 22) or to provide the user 20 with game hints (e.g., hints of where to explore, which elements to collect, etc.). The computer graphics generation system 60 may also generate and render sound effects, via the audio transducer 88, to enhance the user's experience in the AR/VR environment 22.

In one embodiment, the computer graphics generation system 60 may generate the AR/VR environment 22 based on information relating to the user 20 (e.g., transmitted via the one or more antennas 82 and/or stored on the data server 64). For example, the computer graphics generation system 60 may display certain characters, tools/utilities, and/or game scenarios in the AR/VR environment 22 according to the user's play history, game status, membership status, etc. In one embodiment, the computer graphics generation system 60 may generate and render the AR/VR graphics 26 based on the user input (e.g., based on signals from the zoom control 84 and/or the push buttons 86). For example, the computer graphics generation system 60 may display zoomed-in or zoomed-out images in the AR/VR environment 22 according to the degree of zooming effect applied by the user 20 via the zoom control 84. In one example, the computer graphics generation system 60 may display AR/VR graphics 26 to reflect game operations applied by the user 20 via the push buttons 86. For example, the AR/VR graphics 26 may show an object being moved or grabbed in response to the push buttons 86 being applied by the user 20, corresponding to a move or grab function. As may be appreciated, the zoom control 84 and the push buttons 86 may function as a game control or joystick.

To enhance the realism of the generated environment, in certain embodiments, the computer graphics generation system 60 may generate the AR/VR graphics 26 based on the real-world physical environment (e.g., lighting information detected via the one or more light sensors 78, information detected via the one or more presence sensors 80). For example, based on the data collected by the one or more light sensors 78, the computer graphics generation system 60 may determine that the real-world physical environment is dark (e.g., at night). In response to this determination, the computer graphics generation system 60 may decrease the brightness of the generated AR/VR graphics 26, such that the AR/VR environment 22 is presented to the user 20 with suitable brightness. For example, based on the data collected by the one or more light sensors 78, the computer graphics generation system 60 may determine that the real-world physical environment is too dark. In response to this determination, the computer graphics generation system 60 may increase the brightness of the captured real-world images before combining with the AR/VR graphics 26, such that the AR/VR environment 22 is presented to the user 20 with suitable brightness. For example, the computer graphics generation system 60 may process the encoded data from the one or more presence sensors 80 and determine that the angle of view 49 of the fixed-position AR/VR viewer 16 may be blocked or limited (e.g., blocked by a real-world object, a person). In response to a determination that the angle of view 49 may be blocked or limited, the computer graphics generation system 60 may temporarily stop using the captured real-world images from the one or more cameras 74 for generating the AR/VR graphics 26, and instead the previously acquired real-world images from the one or more cameras 74 may be used.

In certain embodiments, to enhance the realism of the generated environment, the computer graphics generation system 60 may generate AR graphics (e.g., AR/VR graphics 26) including real-time digital shadows. The computer graphics generation system 60 may generate real-time digital shadows for the digital objects and AR objects, based on the respective angle of view 49 in relation to the real-world objects and the real-world lighting information (e.g., lighting information detected via the one or more light sensors 78, information detected via the one or more presence sensors 80, time of a day and/or day of a year indicated by an internal clock of a calendar of the computer graphics generation system 60). For example, the digital shadows for the barn house 28 and the two horses 30 may be generated with suitable shapes and brightness that are determined based on incident angles of real-world light sources, such as the Sun and the real-world lighting elements, and based on whether the light is blocked by real-world objects or people, with respect to the perspective angle of view 49.

Furthermore, the computer graphics generation system 60 may be communicatively and operatively coupled to one or more remote viewing devices 65 via the communication network 62. The one or more remote viewing devices 65 may include any suitable displays (e.g., computers, video and/or audio displays, computers) disposed inside or remote from the amusement park 10. The one or more remote viewing devices 65 may also be mobile devices (e.g., mobile phones, smartphones, and tablets) having an application portability profile or APP. The computer graphics generation system 60 may stream the generated AR/VR graphics 26 and/or sound effects to the one or more remote viewing devices 65, such that users viewing the one or more remote viewing devices 65 may see the same AR/VR graphics 26 and/or hear the same sound effects as the user 20 of the fixed-position AR/VR viewer 16.

Figure 4:
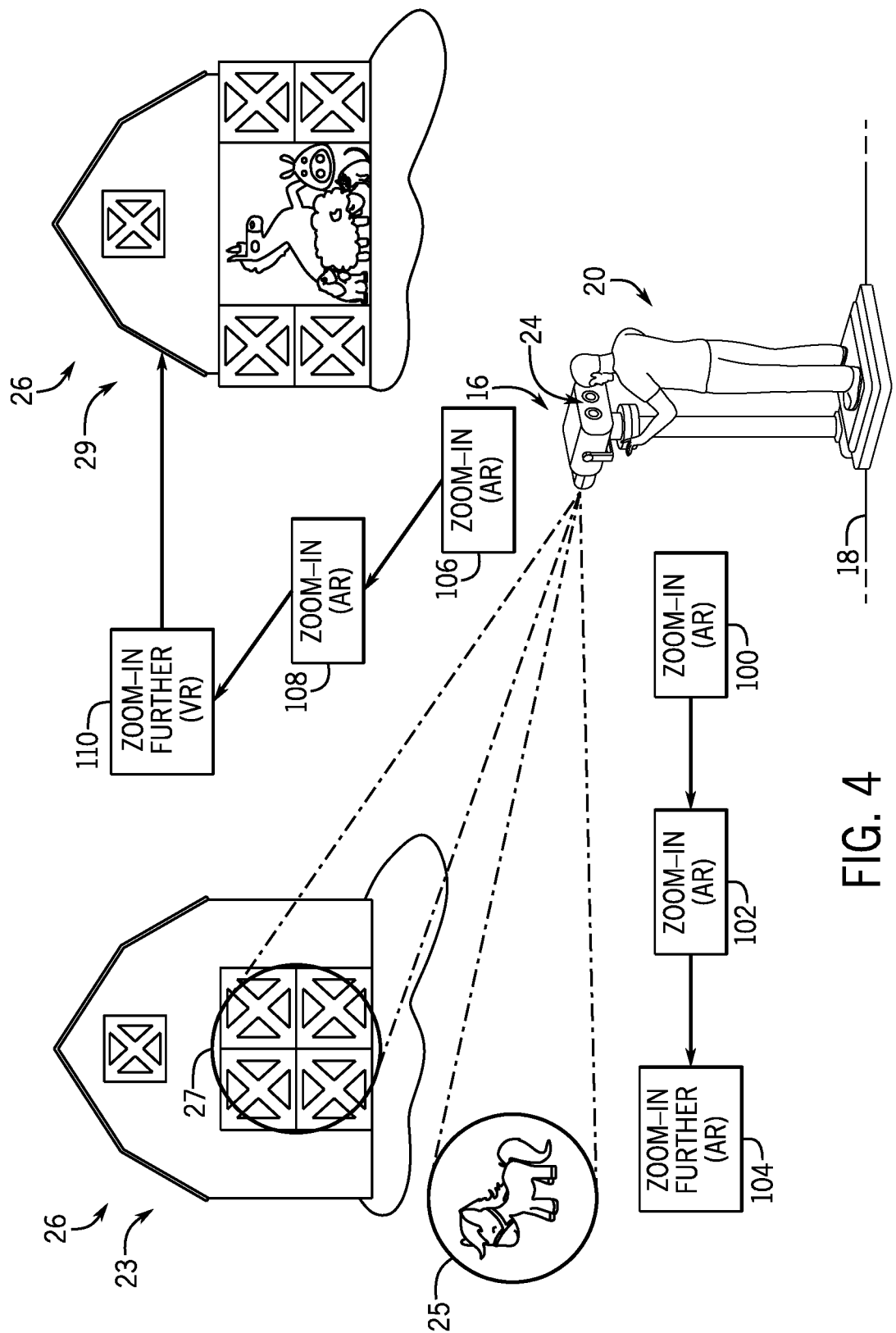
FIG. 4 is a schematic illustrating example transitions between AR and VR environments rendered by the AR/VR system of FIG. 1, in accordance with present embodiments.

Furthermore, the computer graphics generation system 60 may switch between an AR environment and a VR environment in the AR/VR environment 22 based on the user's operation of the zoom control 84. FIG. 4 is a schematic illustrating an example transition between the AR and VR environments, in accordance with an aspect of the present disclosure. In the illustrated embodiment, the user 20 viewing the themed attraction 12 through the display 24 may see the AR/VR graphics 26 only including AR graphics 23. The user 20 may operate the fixed-position AR/VR viewer 16 (e.g., via the zoom control 84) to zoom-in on one of the AR features 25 (e.g., a horse) to see details of the AR feature 25, as indicated in step 100. The user 20 may zoom-in further as indicated in steps 102 and 104 to see more magnified views of the AR feature 25 with more details. As may be appreciated, the user 20 may operate the zoom control 84 in a reverse direction to zoom-out from the AR feature 25. In another embodiment, the user 20 may operate the fixed-position AR/VR viewer 16 (e.g., via the zoom control 84) to zoom-in on another of the AR features 27 (e.g., a door of a barn house) to see magnified details of the AR feature 27, as indicated in step 106. The user 20 may zoom-in further as indicated in step 108 to see a further magnified view of the AR feature 27. As the user 20 continues to zoom-in as indicated at step 110 (e.g., zooming beyond a predetermined magnification threshold), the computer graphics generation system 60 may generate VR graphics 29, such that the user's experience transitions from the AR experience to a VR experience. For example, in step 110, the user's experience transitions into the VR environment, and the user 20 may enjoy the VR graphics 29 as if the user 20 is inside the barn house surrounded by barn animals. As may be appreciated, the user 20 may operate the zoom control 84 in a reverse direction to transition from the VR experience back to the AR experience, to zoom-out on the AR feature 27, or to zoom-out on any VR features.

Figure 5:
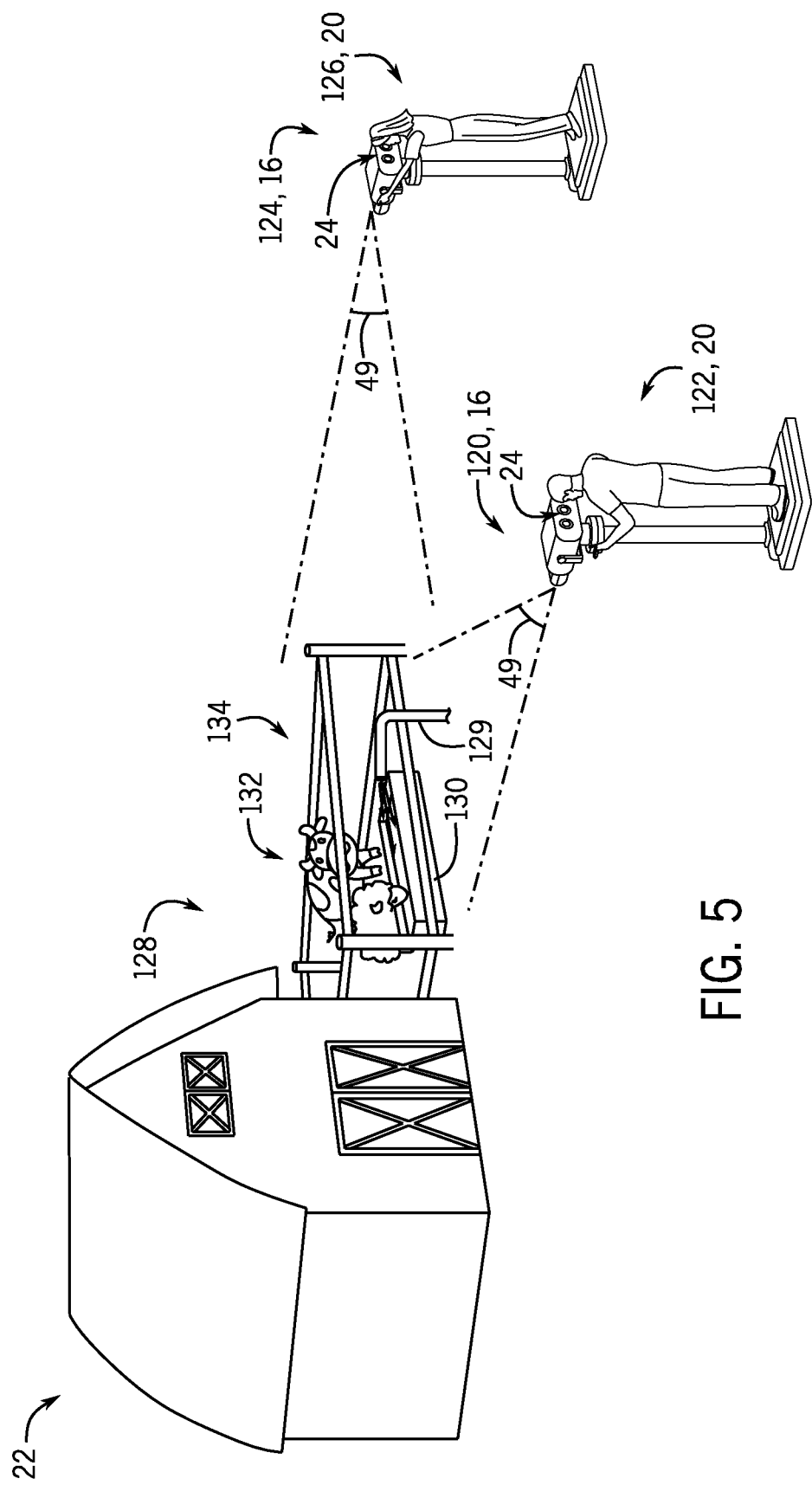
FIG. 5 is a schematic illustrating example AR/VR environments rendered by the AR/VR system of FIG. 1 for multiple fixed-position AR/VR viewers, in accordance with present embodiments.

In one embodiment, the computer graphics generation system 60 may be communicatively and operatively coupled to multiple fixed-position AR/VR viewers 16 to enable multiple users 20 to engage in the same game and/or to see actions applied by other users 20. FIG. 5 is a schematic illustrating an example of such connectivity/engagement between multiple fixed-position AR/VR viewers 16 in the AR/VR environment 22, in accordance with an aspect of the present disclosure. In the illustrated example, the computer graphics generation system 60 is communicatively and operatively coupled to a first fixed-position AR/VR viewer 120 operated by a first user 122 and a second fixed-position AR/VR viewer 124 operated by a second user 126. Both of the first and second users 122 and 126 may see the same AR/VR features 128 shown on the respective displays 24, but from different perspectives. Furthermore, both of the first and second users 122 and 126 may see actions 129 (e.g., actions in the AR/VR environment 22) applied by either of the first and second users 122 and 126 on the respective displays 24. In the illustrated example, the first user 122 operates the first fixed-position AR/VR viewer 120 to execute the actions 129, such as filling a water tank 130 for feeding barn animals 132, as shown in an area 134. For example, the first user 122 may adjust the respective angle of view 49 to aim at the water tank 130, use the zoom control 84 to zoom-in or zoom-out on the water tank 130, and push one of the push buttons 86 to begin filling the water tank 130. Correspondingly, the second user 126, from the respective display 24, may see the action 129 (e.g., filling the water tank 130) applied by the first user 122. In one embodiment, the computer graphics generation system 60 may determine that the second user 126 is also viewing the area 134 (e.g., the respective angle of view 49 of the second fixed-position AR/VR viewer 124 overlaps a portion of the area 134), and in response to this determination, the computer graphics generation system 60 may display the same AR/VR features 128 including the results of the actions 129 on the respective displays 24 of the first and second fixed-position AR/VR viewers 120 and 124. In another embodiment, the computer graphics generation system 60 may determine that the second user 126 is engaged in the same game as the first user 122 (e.g., the second user 126 may provide an indication using the user interface 68 to consent joining the game with the first user 122), and in response to this determination, the computer graphics generation system 60 may display the same AR/VR features 128 including the results of the actions 129 on the respective displays 24 of the first and second fixed-position AR/VR viewers 120 and 124.

Figure 6:
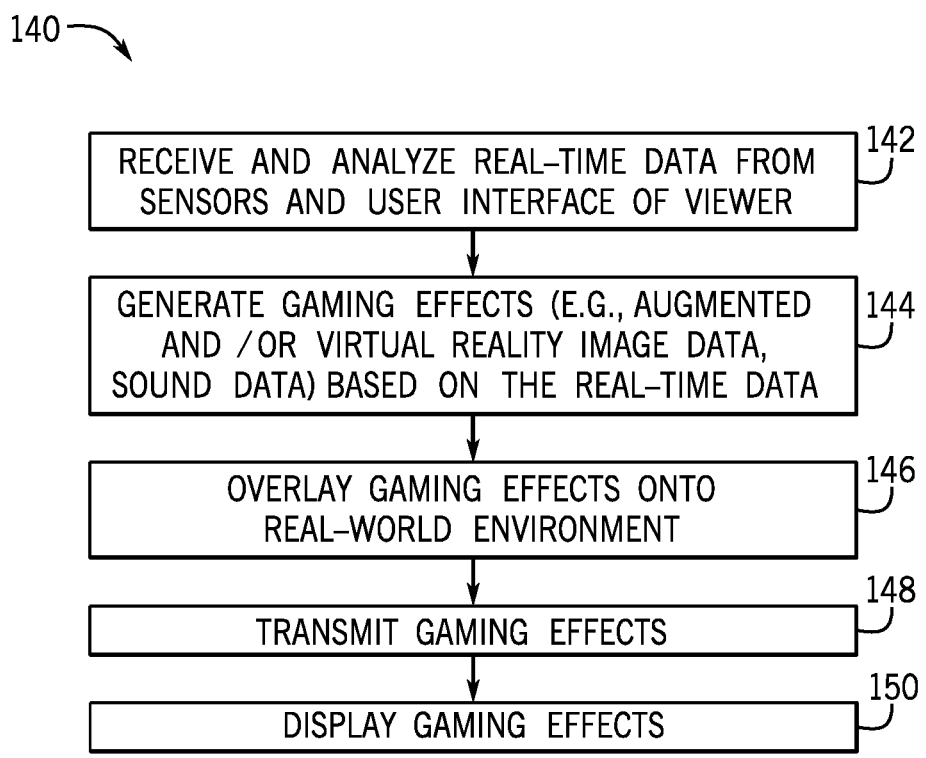
FIG. 6 is a flow diagram illustrating a process for creating an AR/VR experience using the AR/VR system of FIG. 1, in accordance with present embodiments.

FIG. 6 is a process flow diagram illustrating an embodiment of a method 140 of creating an AR experience, a VR experience and/or other computed-mediated experience using the AR/VR system 15. The method 140 may be representative of initiated code or instructions stored in a non-transitory computer-readable medium (e.g., the memory 92) and executed, for example, by the processor 90 of the computer graphics generation system 60. The generated AR experience, VR experience and/or other computer-mediated experience may be enjoyed by the one or more users 20 and/or other guests using the one or more fixed-position AR/VR viewers 16 and/or the one or more remote viewing devices 65. The method 140 may begin with the processor 90 receiving and analyzing (block 142) real-time data from the sensors 66 and the user interface 68 of each of the one or more fixed-position viewers 16. The real-time data may include pictures and/or video captured by the one or more cameras 74, orientation and/or position information and/or the angle of view 49 detected by the one or more orientation and position sensors 76, lighting information detected by the one or more light sensors 78, information indicative of presence of objects or a user near the fixed-position viewer 16 detected by the one or more presence sensors 80, information indicative of the user's identity received by the one or more antennas 82, and so forth. The real-time data may also include inputs (e.g., instructional and/or operational inputs) provided by the user 20 using the user interface 68 via the zoom control 84 and/or the push buttons 86.

The method 140 may then continue with the processor 90 generating (block 144) gaming effects. In one embodiment, the gaming effects may include AR/VR image data and sound data generated based on the received and analyzed real-time data. For example, the gaming effects include particular AR/VR image data relating to a game character associated with the user 20. For example, the gaming effects include certain AR/VR features depending on the angle of view 49 of the fixed-position AR/VR viewer 16 adjusted by the user 20 (e.g., depending on attention/viewing interest of the user 20). For example, the gaming effects may include transitions between AR and VR environments depending on zoom effects applied by the user 20 (e.g., zoom-in beyond certain threshold to transition from an AR environment to a VR environment). As a further example, the gaming effects may include coordinated AR/VR image data for multiple fixed-position AR/VR viewers 16 in a manner that multiple users 20 may share the same gaming experience. The gaming effects may also include sound data corresponding to the AR/VR image data.

The method 140 may then continue with the processor 90 overlaying (block 146) or superimposing the generated gaming effects onto the generated visualization of the real-world environment. The processor 90 may generate a video data stream of the real-world images (e.g., the physical structure 14, the barn house 28 shown in FIG. 1), and overlay or superimpose the AR/VR graphics 26 (e.g., the two horses 30 shown in FIG. 1) onto the real-world images using one or more video merging and/or optical merging techniques. As an example, the processor 90 of the graphics generation system 60 may render the AR/VR graphics 26 in concert with the user's 20 operation of the fixed-position AR/VR viewer 16 to look at certain features (e.g., based on the angle of view 49) or after a predetermined lapse of time. The graphics generation system 60 may perform one or more geometric or photometric recognition algorithms on the video or image data captured via the one or more cameras 74 to determine the angle of view 49 and when to introduce the AR/VR graphics 26. The graphics generation system 60 may determine when to introduce the AR/VR graphics 26 based on inputs provided by the user 20 via the user interface 68.

The method 140 may then conclude with the processor 90 transmitting (block 148) the gaming effects (e.g., overlaid AR/VR graphics 26 along with the real-world environment data and/or sound effects) and displaying (block 150) on the displays 24 of the respective one or more fixed-position AR/VR viewers 16 and/or on the one or more remote viewing devices 65.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A mixed reality viewing system, comprising:
 a viewer configured to be secured to a steady platform and operable by a user to view a theme through the viewer, wherein the viewer comprises:
  a display device;
  a user interface comprising a zoom control; and
  at least one sensor, the at least one sensor comprising at least one camera; and
 a computer graphics generation system communicatively coupled to the viewer and configured to:
  determine a magnification of the zoom control;
  generate streaming media including augmented reality graphics superimposed on image data of a real world environment captured via the at least one camera of the viewer in response to determining that the zoom control is zoomed to a first magnification;
  generate additional streaming media of a virtual reality environment in response to determining that the zoom control is zoomed to a second magnification different than the first magnification; and
  transmit the streaming media or the additional streaming media to be displayed on the display device of the viewer.

2. The mixed reality viewing system of claim 1, wherein the computer graphics generation system is configured to:
 transmit the streaming media including the augmented reality graphics superimposed on the image data of the real world environment to be displayed on the display device in response to determining that the zoom control is zoomed to the first magnification; and
 transmit the additional streaming media of the virtual reality environment to be displayed on the display device in response to determining that the zoom control is zoomed to the second magnification, wherein the second magnification is higher than the first magnification.

3. The mixed reality viewing system of claim 1, wherein the viewer comprises:
 a viewer portion comprising the display device and the user interface, wherein the viewer portion is rotatable by the user to adjust an angle of view; and
 a fixture portion rotatably coupled to the viewer portion and fixedly coupling the viewer to the steady platform.

4. The mixed reality viewing system of claim 1, wherein the display device of the viewer comprises a first display and a second display, and wherein the first display is configured to display the streaming media or the additional streaming media to a first eye of the user and the second display is configured to display the streaming media or the additional streaming media to a second eye of the user.

5. The mixed reality viewing system of claim 4, wherein the first display and the second display include respective characteristic dimensions that enable guests other than the user to view the streaming media or the additional streaming media on the first display, the second display, or both.

6. The mixed reality viewing system of claim 1, wherein the viewer comprises a speaker.

7. The mixed reality viewing system of claim 1, wherein each camera of the at least one camera of the viewer comprises a digital high speed camera having a frame-rate of at least sixty frames per second with a horizontal resolution of at least 4000 pixels.

8. The mixed reality viewing system of claim 1, wherein the at least one sensor comprises one or more orientation and position sensors, one or more multi degree-of-freedom inertial measurement units, one or more light sensors, one or more presence sensors, one or more antennas, or a combination thereof.

9. The mixed reality viewing system of claim 1, comprising a remote display device, wherein the computer graphics generation system is configured to transmit the streaming media or the additional streaming media to be displayed on the remote display device.

10. The mixed reality viewing system of claim 1, wherein the computer graphics generation system has a model of the real world environment surrounding the viewer, wherein the model comprises spatial information of the viewer relative to the real world environment.

11. A fixed-position viewer, comprising:
a display configured to display a streaming media to a user;
a camera configured to capture image data of a real world environment surrounding the fixed-position viewer;
at least one sensor configured to collect information for generation of the streaming media;
a user interface comprising a zoom control configured to enable the user to zoom-in and zoom-out on the streaming media displayed on the display; and
a computer graphics generation system configured to:
receive the image data of the real world environment and the information collected by the at least one sensor;
render the streaming media based at least on the image data and the information; and
transition the streaming media from an augmented reality environment to a virtual reality environment in response to determining that the zoom control is zoomed beyond a pre-determined threshold magnification.

12. The fixed-position viewer of claim 11, wherein the camera comprises a digital high speed camera with a frame rate of at least sixty frames per second and a horizontal resolution of at least 4000 pixels.

13. The fixed-position viewer of claim 11, comprising one or more speakers configured to provide audio effects corresponding to the streaming media displayed on the display.

14. The fixed-position viewer of claim 11, wherein the at least one sensor comprises one or more orientation and position sensors, one or more multi degree-of-freedom inertial measurement units, one or more light sensors, one or more presence sensors, one or more antennas, or a combination thereof.

15. The fixed-position viewer of claim 11, wherein the display includes a characteristic dimension that enables one or more guests other than the user of the fixed-position viewer to view the streaming media on the display.

16. The fixed-position viewer of claim 11, wherein the information collected by the at least one sensor comprises user information, and wherein at least some content of the streaming media displayed on the display is customized to the user based on the user information.

17. A method, comprising:
receiving real-time data from at least one sensor and a user interface of a fixed-position viewer;
analyzing the real-time data via a computer graphics generation system;
generating gaming effects, via the computer graphics generation system, based on the real-time data, wherein generating the gaming effects via the computer graphics generation system comprises:
generating streaming media including augmented reality graphics overlaid onto a visualization of a real world environment in response to determining that a zoom control of the user interface is zoomed to a first magnification; and
generating additional streaming media including virtual reality graphics that replace the visualization of the real world environment in response to determining that the zoom control of the user interface is zoomed to a second magnification that is different than the first magnification;
transmitting, via the computer graphics generation system, the gaming effects including the streaming media or the additional streaming media to the fixed-position viewer; and
displaying, via the computer graphics generation system, the streaming media or the additional streaming media on a display of the fixed-position viewer.

18. The method of claim 17, wherein the second magnification is greater than the first magnification.

19. The method of claim 17, wherein receiving the real-time data comprises receiving, via the computer graphics generation system, data collected via at least one or more orientation and position sensors, one or more multi degree-of-freedom inertial measurement units, one or more light sensors, one or more presence sensors, or one or more antennas of the fixed-position viewer.

20. The method of claim 17, comprising:
transmitting, via the computer graphics generation system, auxiliary streaming media or auxiliary additional streaming media to an additional fixed-position viewer, wherein the auxiliary streaming media and the auxiliary additional streaming media comprise visualization content corresponding to the streaming media and the additional streaming media, respectively, displayed on the fixed-position viewer from a perspective of the additional fixed-position viewer; and
displaying, via the computer graphics generation system, the auxiliary streaming media or the auxiliary additional streaming media on a respective display of the additional fixed-position viewer.

* * * * *